US012485383B2

(12) United States Patent
Thompson (10) Patent No.: US 12,485,383 B2
(45) Date of Patent: Dec. 2, 2025

(54) REMOVAL OF MERCURY IN A GAS DEHYDRATION PROCESS USING THERMALLY STABLE CHEMICAL ADDITIVES

(71) Applicant: CHEVRON U.S.A. INC., San Ramon, CA (US)

(72) Inventor: Joshua A. Thompson, Martinez, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/610,078

(22) Filed: Mar. 19, 2024

(65) Prior Publication Data

US 2025/0090997 A1   Mar. 20, 2025

Related U.S. Application Data

(63) Continuation of application No. 17/524,839, filed on Nov. 12, 2021, now abandoned.

(60) Provisional application No. 63/112,725, filed on Nov. 12, 2020.

(51) Int. Cl.
| | | |
|---|---|---|
| *B01D 53/14* | (2006.01) | |
| *B01D 53/26* | (2006.01) | |
| *B01D 53/64* | (2006.01) | |
| *B01D 53/77* | (2006.01) | |
| *B01D 53/96* | (2006.01) | |

(52) U.S. Cl.
CPC ....... *B01D 53/1493* (2013.01); *B01D 53/263* (2013.01); *B01D 53/64* (2013.01); *B01D 53/77* (2013.01); *B01D 53/96* (2013.01); *B01D 2252/2023* (2013.01); *B01D 2252/2056* (2013.01); *B01D 2253/10* (2013.01); *B01D 2257/602* (2013.01); *B01D 2259/40083* (2013.01)

(58) Field of Classification Search
CPC .. B01D 53/1493; B01D 53/263; B01D 53/64; B01D 53/77; B01D 53/96; B01D 2252/2023; B01D 2252/2056; B01D 2253/10; B01D 2257/602; B01D 2259/40083
See application file for complete search history.

(56) References Cited

U.S. PATENT DOCUMENTS 10,041,014 B2 *   8/2018   Thompson .............. B01J 20/103

OTHER PUBLICATIONS

Rostkowska et al. (Proton-Transfer Processes in Thiourea: UV Induced Thione--> Thiol Reaction and Ground State Thiol--> Thione Tunneling, J Phys. Chem. A 2003, 107, 6373-6380). (Year: 2003).*

(Continued)

*Primary Examiner* — Youngsul Jeong
(74) *Attorney, Agent, or Firm* — Jason M. Guerrero (57) ABSTRACT

The present invention is directed to the removal of mercury in a gas dehydration process using thermally table chemical additives. In the process a complexing agent is added to a recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product.

8 Claims, 6 Drawing Sheets

(56) References Cited

OTHER PUBLICATIONS

Hutchison et al. (The removal of mercury from water by open chain ligands containing multiple sulfurs, Journal of Hazardous Materials 156 (2008) 458-465) (Year: 2008).*

* cited by examiner

REMOVAL OF MERCURY IN A GAS DEHYDRATION PROCESS USING THERMALLY STABLE CHEMICAL ADDITIVES

FIELD OF THE INVENTION

This invention relates to the removal of mercury in a gas dehydration process using thermally stable chemical additives.

BACKGROUND OF THE INVENTION

Glycol dehydrators are used frequently in gas processing to dry natural gas either after an amine sweetening unit or prior to transport gas in a pipeline from a platform to an onshore facility. The glycol absorbs water vapor from the natural gas, producing the dry natural gas product. Rich glycol solvent containing water and other components is recycled by vaporizing water at low pressure and elevated temperatures in a continuous manner. Other components soluble in rich glycol solvents include methane and other hydrocarbons. If mercury is present in natural gas, the mercury may be distributed between the dry natural gas, the rich glycol solvent or the overhead vent in the glycol regenerator.

Typically, adsorbers are used to remove heavy metals such as mercury from the gas phase to specifications, such as 0.1 ug/Nm3, with an adsorbent such as activated carbon, zeolites or supported metals known in the art. Supported metals are often copper on alumina that has been reacted with sulfur to produce a copper sulfide adsorbent material known in the art. These adsorbents do not necessarily work upfront of a glycol dehydrator where natural gas contains water vapor and are therefore located downstream of the glycol dehydration system, resulting in mercury distributed outside the dry natural gas that is fed to adsorbers in the prior art.

SUMMARY OF THE INVENTION

An embodiment of the invention is a process wherein a complexing agent is added to a recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product.

DETAILED DESCRIPTION OF THE INVENTION

Gas dehydrators are ubiquitous in gas processing for removing excess water in raw and process gas streams before the gas is transported via pipelines. Inclusion of a mercury capture agent in a gas dehydrator would concentrate the mercury in one section of a gas processing plant, preventing the mercury from distributing in other parts of the plant. The process and associated system as described herein would improve reliability of the production of gas and allow for a single area for mercury to be concentrated and removed during gas processing.

Figure 1:
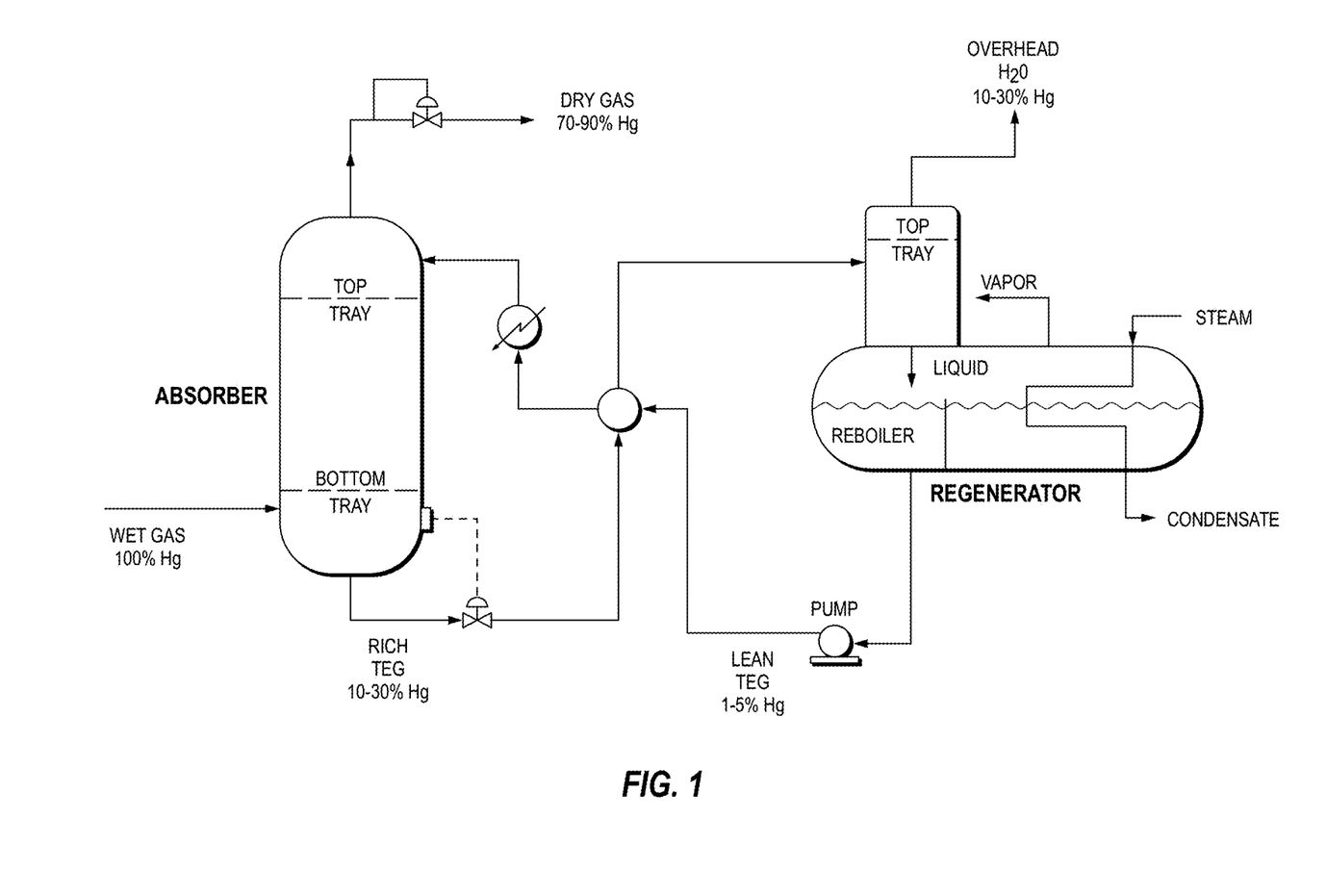
FIG. 1 is a diagram of a typical glycol dehydration process and system.

In a typical gas processing plant or in a typical offshore gas dehydration system, mercury-containing natural gas is fed to a glycol dehydration system as shown in attached FIG. 1. The natural gas, which is saturated with water and contains some amount of mercury, is contacted with a glycol solvent containing between 97-99.5 wt % glycol and 0.5-3 wt % water in a pressurized gas-liquid contactor, flowing counter currently between the gas and liquid. In this instance, mercury is absorbed by the glycol solvent and between 10 and 50% of mercury is removed in the pressurized liquid contactor. The liquid contactor can be composed of tray columns or packed columns. The glycol solvent, now containing an increased amount of water and mercury, is known as the rich glycol solvent. This rich glycol is depressurized by flashing the pressurized liquid through an expansion valve. The rich glycol solvent is heated and sent to the top of a regenerator. The glycol is regenerated in the regenerator which operates at the top of the tower between 90 and 110 degrees Celsius and at the bottom in a reboiler which operates between 190 and 205 degrees Celsius. The regenerated, or lean, glycol is cooled and then recirculated through a pumping system back to the liquid contactor. The overhead of the regenerator contains water and mercury vapor.

Figure 2:
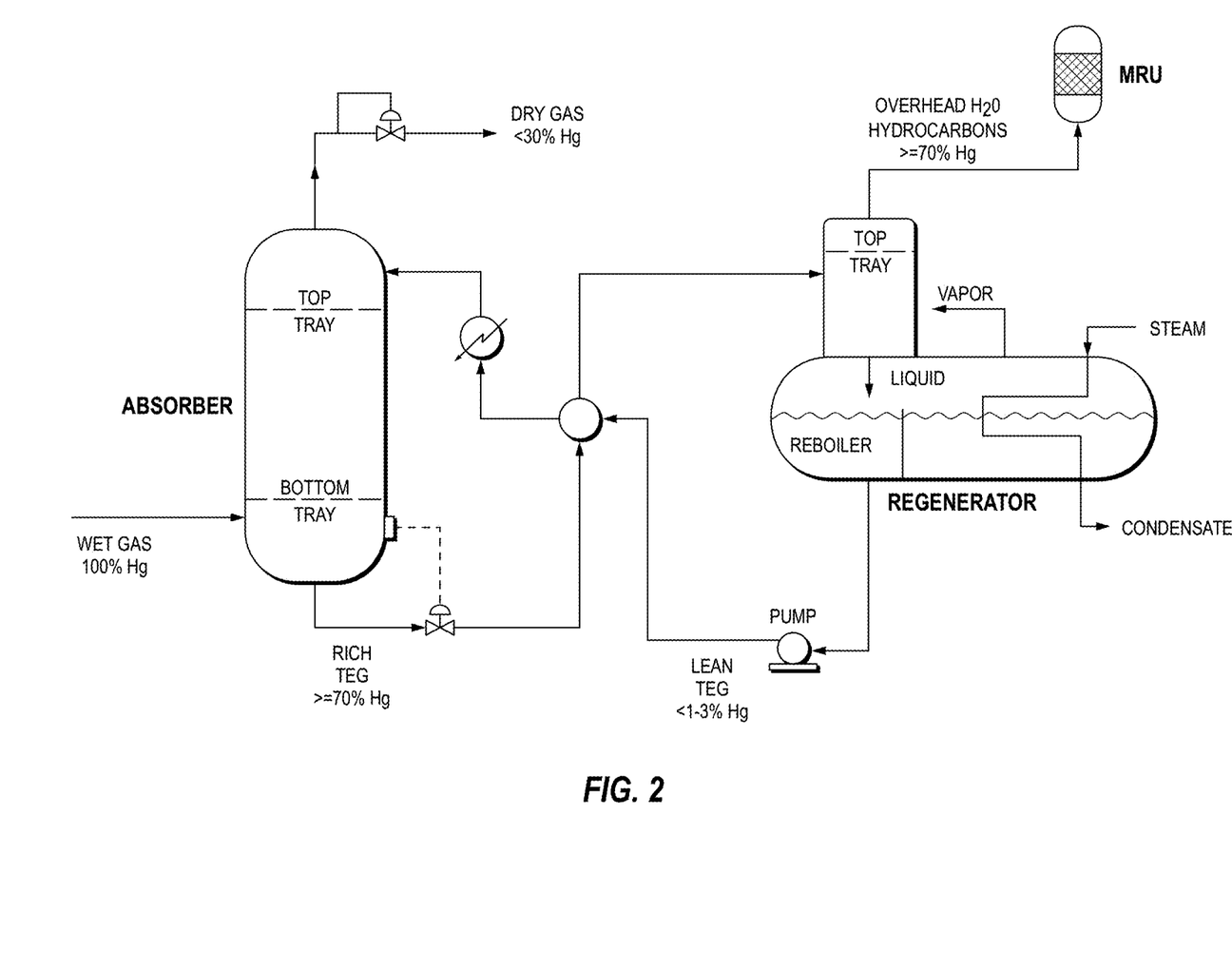
FIG. 2 is a diagram of a glycol dehydration process and system with overhead absorber to remove volatile mercury.

In one embodiment shown in attached FIG. 2, a complexing agent is added to the recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product. The rich glycol with the complexing agent is fed to the regenerator and continuously regenerated. The overhead of the regenerator containing water and mercury vapor is contacted with an adsorbent that captures mercury, using an adsorbent such as an activated carbon, alumina, silica, zeolite or supported metal.

Figure 3:
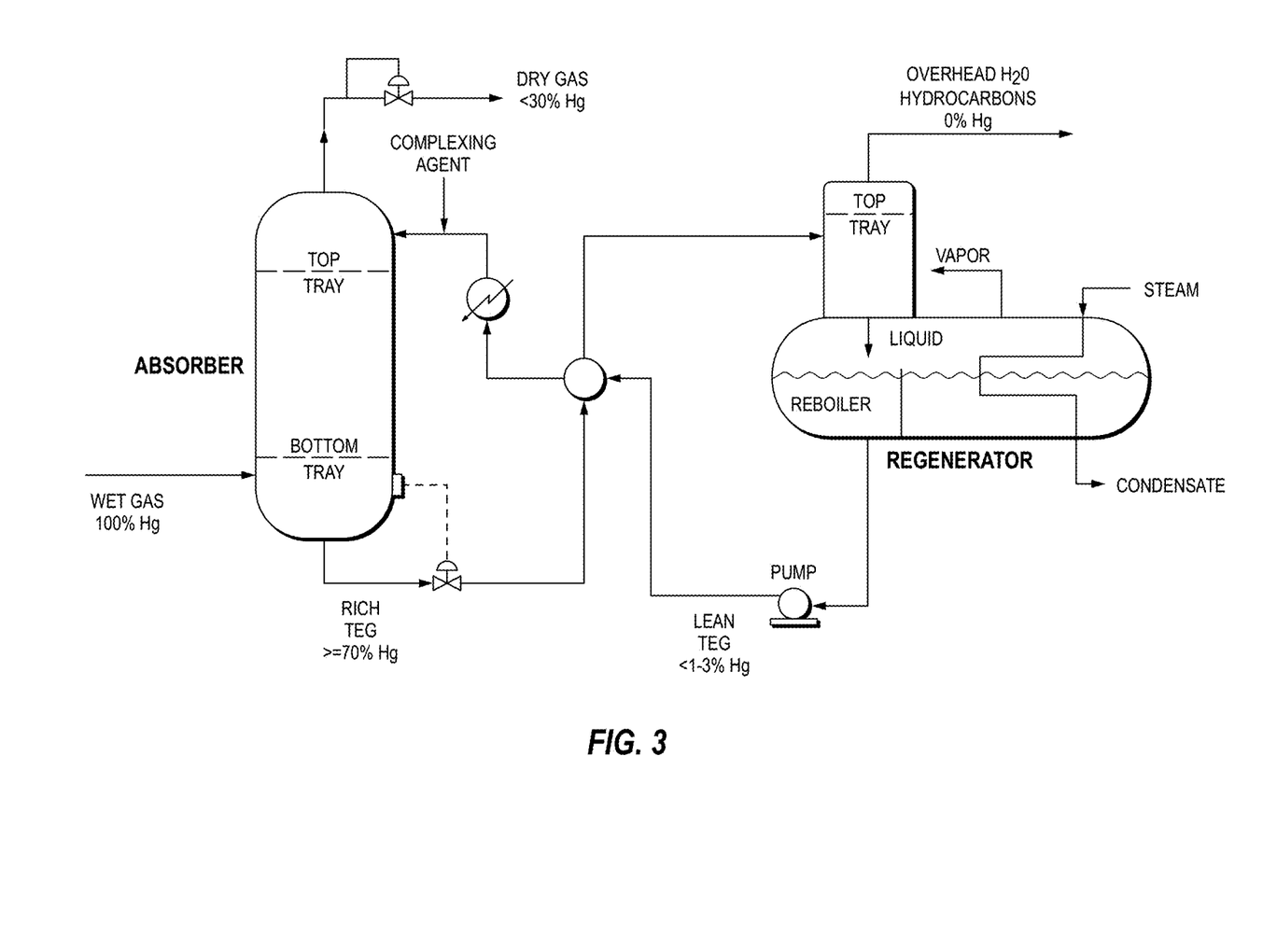
FIG. 3 is a diagram of glycol dehydration process and system with rich glycol adsorber to remove mercury and partially remove a complexing agent.

In another embodiment shown in attached FIG. 3, a complexing agent is added continuously prior to the liquid contactor. Inside the liquid contactor, the complexing agent dissolved in the lean glycol solvent selectively reacts with the mercury in the natural gas, producing a rich glycol solvent containing mercury. The rich glycol solvent is then sent to an adsorber where mercury and the complexing agent are removed using an adsorbent, such as an activated carbon, ion-exchange resin, alumina, silica, zeolite or supported metal. The rich glycol with reduced complexing agent and no mercury is then fed to the regenerator to remove water in the overhead and regenerate the glycol solvent.

Figure 4:
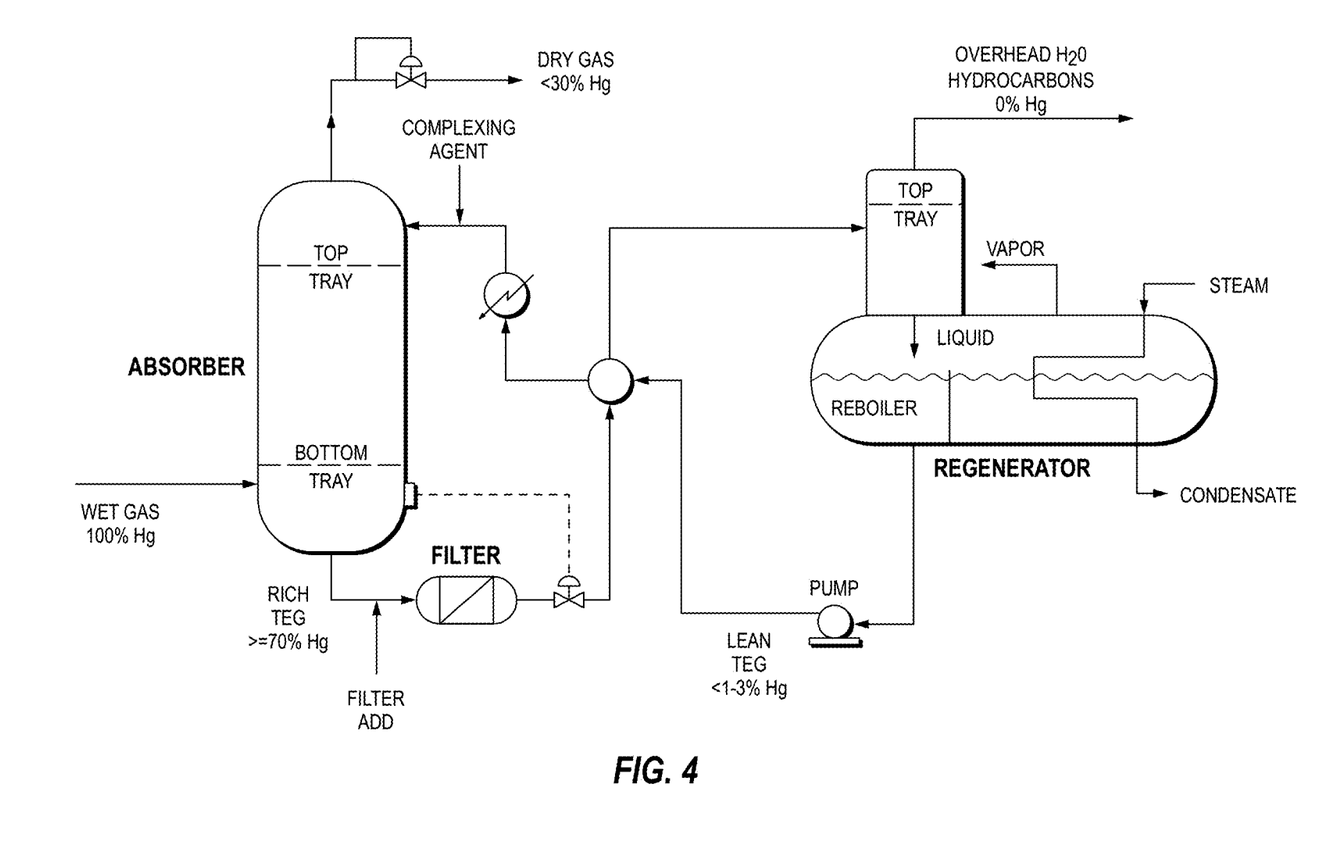
FIG. 4 is a diagram of glycol dehydration process and system with rich glycol filter to remove mercury and partially remove a complexing agent using a filter aid.

In another embodiment shown in attached FIG. 4, a complexing agent is added continuously prior to the liquid contactor. Inside the liquid contactor, the complexing agent dissolved in the lean glycol solvent selectively reacts with the mercury in the natural gas, producing a rich glycol solvent containing mercury. A filter aid is then added after the liquid contactor, but prior to the expansion valve. This filter aid allows for the filtration of the complexing agent with mercury and the filter aid. The filtration may be performed using a mechanical filter, carbon filter, ultrafiltration filter or nanofiltration filter. The rich glycol with reduced complexing agent and no mercury is then fed to the regenerator to remove water in the overhead and regenerate the glycol solvent.

The complexing agent refers to a material or compound capable of reacting with volatile mercury in natural gas after absorbing in the glycol solvent, forming a non-volatile mercury complex. Examples of non-volatile mercury complexes include HgS and soluble mercury-sulfur materials, such as $HgSx2-$, and mercury thiolate complexes of the general form R1S—Hg—SR2. Volatile mercury refers to mercury in the gas phase and is primarily elemental mercury ($H_g0$).

An embodiment of the invention is a process wherein a complexing agent is added to a recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product. The rich glycol with the complexing agent is fed to the regenerator and continuously regenerated. The overhead of the regenerator containing water and mercury vapor is contacted with an adsorbent that captures mercury, using an adsorbent such as an activated carbon, alumina, silica, zeolite or supported metal.

In another embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. The rich glycol solvent is then sent to an adsorber where mercury and the complexing agent are removed using an adsorbent, such as an activated carbon, ion-exchange resin, alumina, silica, zeolite or supported metal. The rich glycol with reduced complexing agent and no mercury is then fed to the regenerator to remove water in the overhead and regenerate the glycol solvent.

In a further embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. A filter aid is then added after the liquid contactor, but prior to the expansion valve. This filter aid allows for the filtration of the complexing agent with mercury and the filter aid. The filtration may be performed using a mechanical filter, carbon filter, ultrafiltration filter or nanofiltration filter. The rich glycol with reduced complexing agent and no mercury is then fed to the regenerator to remove water in the overhead and regenerate the glycol solvent.

Examples of the complexing agent include but are not limited to glycol-soluble sulfur, such as sulfides, hydrosulfides, thiocarbamates, and inorganic polysulfides. Other examples of the complexing agent include mercaptans, organic polysulfides, and sulfanes. Further examples include thiol-functionalized organic compounds.

In one embodiment, the complexing agent is an inorganic polysulfide such as sodium polysulfide, for an extraction of mercury from the natural gas according to equation: Hg (g)+$Na_2Sx$ (aq)+$H_2O$→$HgS_2H—$ (aq)+$Na_2Sx-2$ (aq)+ OH— (aq), where (g) denotes the mercury in the gas phase, and (aq) denotes a species in water. The charges are balanced by other species. Solid HgS is not formed and the mercury remains in solution as an anionic species. In another embodiment, the complexing agent is a compound with a relatively high boiling point, e.g., not too volatile and above 100° C. in one embodiment and above 125° C. in another embodiment. If not, the complexing agent would be lost in the stripping operation for the removal of adsorbed acid gas from the acid gas scrubbing solution. In yet another embodiment the complexing agent is sodium sulfide. Sodium sulfide and other complexing agents may promote the removal of mercury from gas streams containing high CO2 concentrations but low H2S concentrations. In yet another embodiment the complexing agent is hydrogen sulfide (H2S) or a combination of hydrogen sulfide and one or more of the above-mentioned complexing agents.

Examples of the filter aid used in one embodiment include inorganic polysulfides, sulfides, thiocarbamates, organic polysulfides, metal sulfides, such as Cu(I)2S, Cu(II)S, and MoS, hydrosulfides, and thiol-containing polymers.

Examples of the glycol solvent include triethylene glycol and tetraethylene glycol, containing between 97 and 99.9 wt % of glycol in the lean glycol solvent.

EXAMPLES

Example 1

In a three-neck flask with a Teflon stirrer (a glass reactor), 200 mL of solution of stannous chloride and sulfuric acid were prepared and heated to 70 degrees Celsius with a concentration of 10 wt % stannous chloride and 5 wt % sulfuric acid. When volatile mercury was to be generated, 1.0 mL of 200 ppm Hg solution of mercuric chloride in deionized water was injected into the reactor via a septum. The stannous chloride rapidly reduced the ionic mercury to elemental mercury. In the glass reactor, a gas line with 200 cc/min of either nitrogen or carbon dioxide bubbled through the acidic solution. This gas was used to carry the elemental mercury to the downstream absorbers for absorption removal.

The glass reactor was connected to two absorbers in series, each of which contained 200 mL of solution. The absorbers were equipped with a glass frit to produce small bubbles. The contact time inside both absorbers was approximately one second between a gas bubble and the surrounding solvent. The second absorber contained either 3 wt % sodium polysulfide in the case of when nitrogen was used as a carrier gas or 1 wt % I2 in white oil in the case of when carbon dioxide was used as a carrier gas. The second absorber was used as a scrubber to remove any traces of elemental mercury not absorbed in the first absorber.

Samples of liquids in the reactor and the two absorbers and gas leaving the reactor were drawn at periodic intervals over a 1 hour to a 3 hour period and analyzed for mercury by a Lumex detector. Mercury balances were checked to be within 95% or more to be used in analysis. After a typical reaction time of 1 hour to 3 hours, the ionic mercury is converted to elemental mercury and removed from the reactor by the carrier gas by an average conversion of 90-99%.

The efficiency of the complexing agents are evaluated by the mercury mass balance in the two absorbers and the improvement in mercury taken up in the first absorber compared to a case when no additive is used in the glycol solvent. This allows deduction of the process performance improvement over the glycol solvent in a pressurized liquid contactor. It is expected that a proportional increase in solubility of volatile mercury in the rich glycol solvent will result from the proportional improvement of the efficiency for mercury when a complexing agent is used.

Examples 2-5

These experiments are used to evaluate the efficiency improvement of 2,2'-(ethylenedioxy)-diethanethiol (DODT) as a complexing agent under various process conditions. DODT is effective in improving the efficiency for volatile mercury removal in the first absorber containing triethylene glycol (TEG). DODT was added in varying amounts with different process conditions as listed in Table 1. Beyond 5000 ppmv concentration in DODT, there is little enhancement in the capture efficiency, suggesting that only 5000 ppmv or less is required for mercury capture.

TABLE 1

Examples 2-5

| Example | Solvent | ppmv DODT | S/Hg Molar Ratio | Efficiency Capture (%) |
|---|---|---|---|---|
| 2 | TEG | 0 | N/A | <1 |
| 3 | TEG | 500 | 88 | 25 |
| 4 | TEG | 5000 | 880 | 50 |
| 5 | TEG | 100000 | 8800 | 60 |

Examples 6-9

Because glycol solvents are continually regenerated during process, the thermal stability and volatility of the chemical additive will impact how frequently the chemical is added to the process and also impact on the process operation due to any degradation of the additive. Examples 6-9 demonstrate the improvement in volatility and/or thermal stability of using DODT over other chemical additives, such as sodium polysulfide. A flask containing 200 mL solvent with either 10 vol % DODT or 1.5 vol % sodium polysulfide with an overhead condenser was heated to 200 degrees C. for 24 hrs to accelerate the effect of high temperature on different solvent systems. Of the two solvents, the DODT-containing solvent only lost 39% of sulfur compared to the neat solvent while the sodium polysulfide-containing solvent lost 79% of sulfur compared to the neat solvent. The degradation of sodium polysulfide results in hydrogen sulfide formation, resulting in the higher loss of sulfur from the solvent. The DODT has more volatility compared to TEG; however, at the top of the regeneration section of the glycol dehydration process, the volatility of the two solvents is still relatively low compared to water, with vapor pressure for DODT and TEG of 76 and 14 Pa, respectively, at 100 degrees C.

TABLE 2

Examples 6-9

| Example | Solvent | Additive Concentration (vol %) | Chemical Additive | Solvent Heating Time at 200 degrees C. | Sulfur Loss (%) |
|---|---|---|---|---|---|
| 6 | TEG | 10 | DODT | 0 hrs | 0 |
| 7 | TEG | 10 | DODT | 24 hrs | 39 |
| 8 | TEG | 1.5 | Sodium Polysulfide | 0 hrs | 0 |

TABLE 2-continued

Examples 6-9

| Example | Solvent | Additive Concentration (vol %) | Chemical Additive | Solvent Heating Time at 200 degrees C. | Sulfur Loss (%) |
|---|---|---|---|---|---|
| 9 | TEG | 1.5 | Sodium Polysulfide | 24 hrs | 79 |

Comparative Examples 10-12

FIG. 4 shows a process flow diagram of a research unit capable of evaluating gas-liquid contacting with option for on-stream solvent regeneration. In Examples 10-12, pure TEG solvent is used to assess the mercury removal capability of the solvent under typical glycol dehydration gas-liquid contactor conditions. The gas flowrate and gas-phase mercury concentration of the feed gas are kept constant. In these examples, the liquid flowrate of the glycol solvent is varied to change the amount of mercury removed by gas-liquid contacting. As shown in Table 3, there is a correlated increase with the mercury removal as the liquid flowrate is increased. This is related to increased driving force for absorption to take place as the glycol solvent flowrate increases.

TABLE 3

Examples 10-12

| Example | Solvent | Relative Liquid Flowrate | Mercury Removal from Gas |
|---|---|---|---|
| 10 | TEG | 50% | 19% |
| 11 | TEG | 100% | 24% |
| 12 | TEG | 200% | 31% |

Example 13

Figure 5:
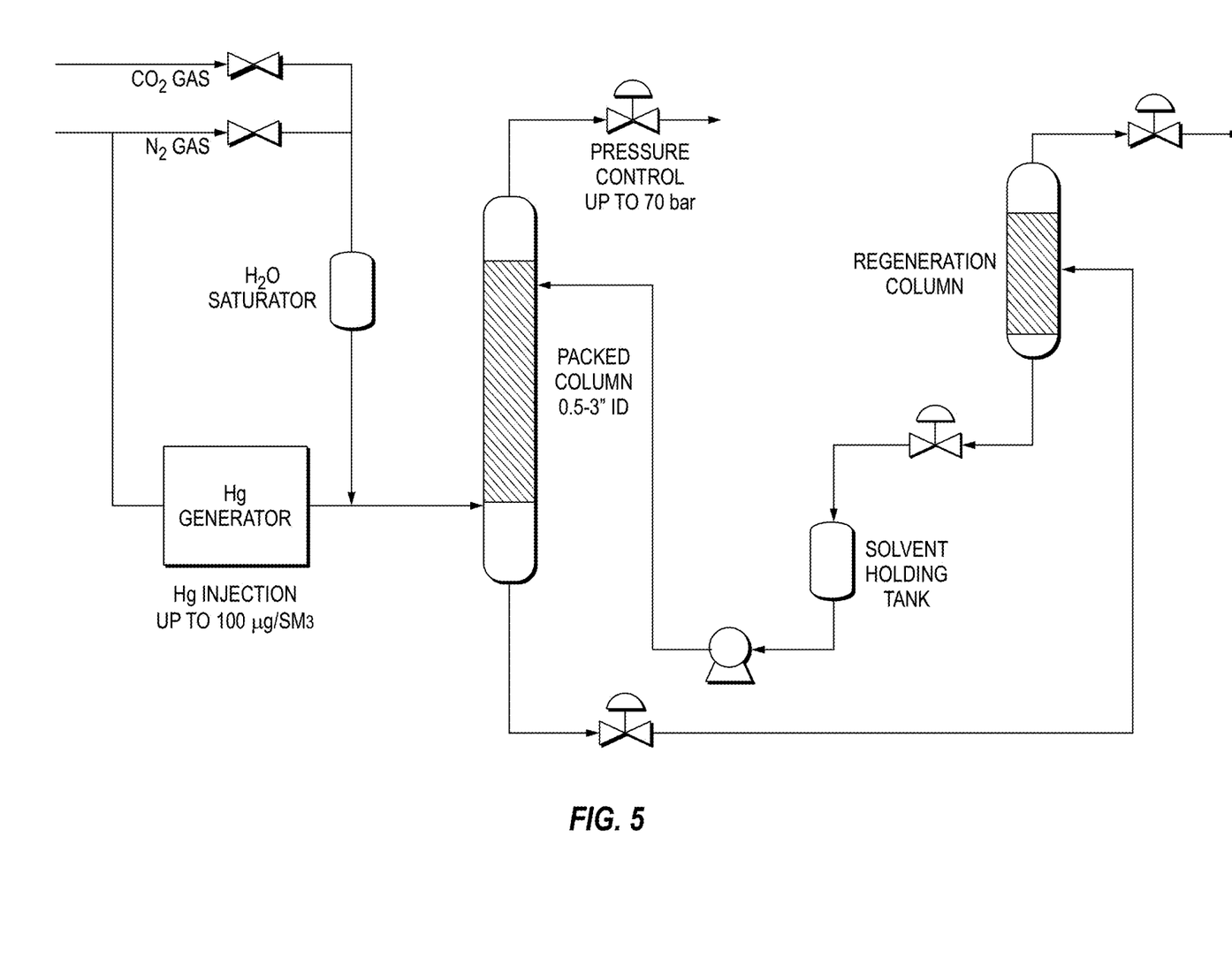
FIG. 5 is a diagram of a counter-current gas liquid contacting system with on stream solvent regeneration.
Figure 6:
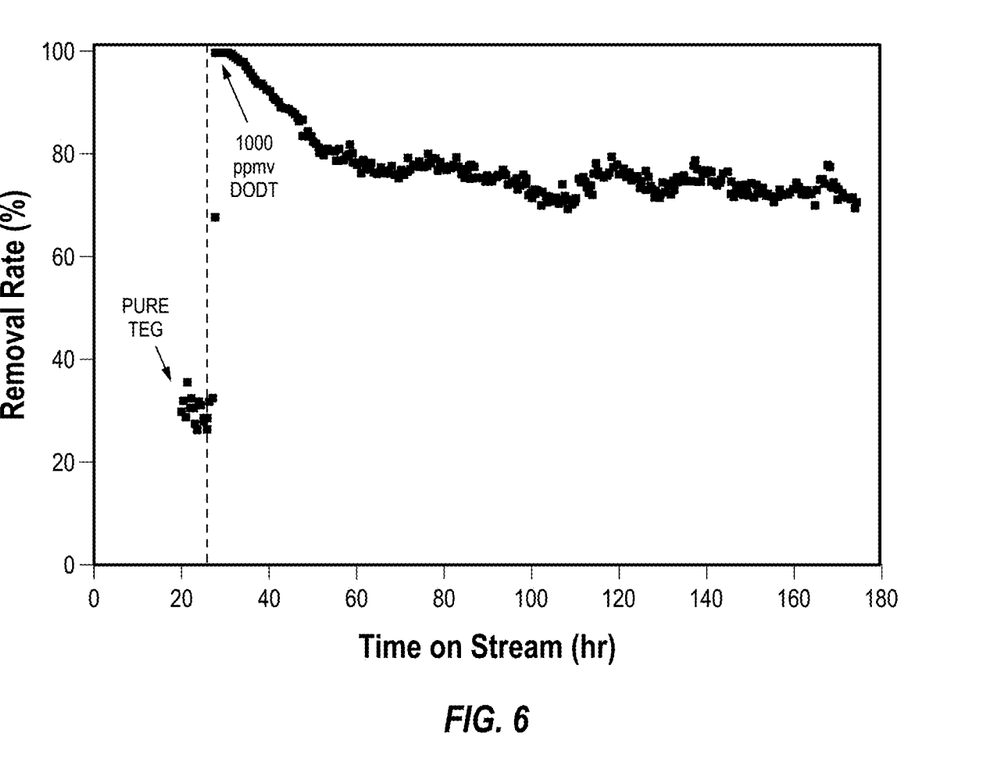
FIG. 6 is a plot of the mercury removal rate from gas phase as pure TEG is transitioned to TEG containing 1000 ppmv DODT.

To test the addition of DODT to TEG solvent for enhanced mercury removal, 1000 ppmv of DODT is dissolved in TEG solvent. While the pure TEG is fed to the gas-liquid contactor, there is a steady-state removal of approximately 30%. When the solvent is switched from pure TEG to 1000 ppmv DODT, there is a step change in removal to 100% and then the contactor reaches a removal rate steady state of 70-80%, depending on the glycol liquid flowrate in the column. FIG. 5 shows a summary of process data collected for the removal of mercury from the gas phase. As shown, the step change in removal rate occurs at 26 hours time on stream when the DODT is introduced to the contactor and removal is maintained for more than 150 hours.

What is claimed is:
1. A process for removal of mercury in a gas dehydration system comprising:
 (a) adding a complexing agent to a recirculated glycol solvent as part of a glycol solution feed to a dehydration liquid contactor and recirculating the complexing agent continuously with the glycol solvent in the dehydration liquid contactor;
 (b) contacting the glycol solution feed with a wet natural gas containing mercury in the dehydration liquid contactor, and selectively reacting the complexing agent with mercury in the wet natural gas to remove the mercury from the wet natural gas thereby producing a dry natural gas product and a rich glycol solvent comprising the complexing agent; and (c) feeding the rich glycol solvent comprising the complexing agent to a regenerator and continuously regenerating the rich glycol solvent comprising the complexing agent, wherein the complexing agent comprises a dithiol-functionalized organic compound, and wherein the dithiol-functionalized organic compound is 2,2'-(ethylenedioxy)-diethanethiol (DODT).

2. The process of claim 1, wherein an overhead of the regenerator containing water and mercury vapor is transported to an adsorber and contacted with an adsorbent in the adsorber that captures mercury.

3. The process of claim 2, wherein the adsorbent is selected from the group consisting of activated carbon, alumina, silica, zeolite and supported metal.

4. A process for removal of mercury in a gas dehydration system comprising:

(a) adding and dissolving a complexing agent continuously to a lean glycol solvent prior to a liquid contactor and providing a natural gas comprising mercury to the liquid contactor, wherein inside the liquid contactor, the complexing agent dissolved in the lean glycol solvent selectively reacts with the mercury in the natural gas, producing a rich glycol solvent containing mercury and a mercury-removed natural gas; and (b) the rich glycol solvent is then sent to an adsorber where mercury and the complexing agent are removed from glycol solvent using an adsorbent thereby producing a rich glycol solvent with reduced complexing agent and no mercury, wherein the complexing agent comprises a dithiol-functionalized organic compound, and wherein the dithiol-functionalized organic compound is 2,2'-(ethylenedioxy)-diethanethiol (DODT).

5. The process of claim 4, wherein the adsorbent is selected from the group consisting of activated carbon, ion-exchanged resin, alumina, silica, zeolite and supported metal.

6. The process of claim 5, wherein the rich glycol solvent with reduced complexing agent and no mercury is fed to a regenerator to remove water and regenerate glycol solvent.

7. The process of claim 4, wherein a filter aid is then added after the liquid contactor, but prior to an expansion valve.

8. The process of claim 7, wherein the filter aid is a mechanical filter, carbon filter, ultrafiltration filter or nanofiltration filter.

* * * * *